United States Patent
Bliesner

(10) Patent No.: US 6,435,458 B1
(45) Date of Patent: Aug. 20, 2002

(54) TAILORED WING ASSEMBLY FOR AN AIRCRAFT MOVEABLE SLAT SYSTEM

(75) Inventor: Wayne T. Bliesner, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/781,661

(22) Filed: Feb. 12, 2001

(51) Int. Cl.⁷ .................................................. B64C 3/50
(52) U.S. Cl. ....................... 244/214; 244/213; 244/210; 244/218
(58) Field of Search ................................. 244/214, 209, 244/210, 216, 218, 219

(56) References Cited

U.S. PATENT DOCUMENTS

| | | | |
|---|---|---|---|
| 2,441,279 A | * 5/1948 | McCollum | .................. 165/177 |
| 4,283,029 A | * 8/1981 | Rudolph | ..................... 244/207 |
| 4,285,482 A | 8/1981 | Lewis | |
| 4,398,688 A | * 8/1983 | Williams | ..................... 244/207 |
| 4,399,970 A | 8/1983 | Evans | |
| 4,422,606 A | 12/1983 | Munroe | |
| 4,445,655 A | 5/1984 | Hueberger | |
| 4,544,117 A | * 10/1985 | Schuster | ..................... 239/154 |
| 4,585,192 A | 4/1986 | Clifford-Jones | |
| 4,615,499 A | 10/1986 | Knowler | |
| 4,712,752 A | * 12/1987 | Victor | ......................... 244/123 |
| 4,913,381 A | 4/1990 | Mabey | |
| 5,056,741 A | 10/1991 | Bliesner et al. | |
| 5,178,348 A | 1/1993 | Bliesner | |
| 5,544,847 A | 8/1996 | Bliesner | |
| 5,551,651 A | * 9/1996 | Hendrickson | ................ 244/215 |
| 5,655,737 A | 8/1997 | Williams et al. | |
| 5,788,190 A | 8/1998 | Siers | |
| 5,927,656 A | * 7/1999 | Hinkleman | .................. 244/203 |
| 6,015,117 A | * 1/2000 | Broadbent | ................... 244/214 |
| 6,050,527 A | * 4/2000 | Hebert et al. | ............... 137/15.1 |
| 6,138,957 A | * 10/2000 | Nastasi et al. | .............. 244/219 |

* cited by examiner

Primary Examiner—Charles T. Jordan
Assistant Examiner—Stephen Holzen
(74) Attorney, Agent, or Firm—Harness Dickey & Pierce P.L.C.

(57) ABSTRACT

A wing assembly for an aircraft moveable slat system has a fixed structure and a contoured surface. The fixed structure has an exterior surface defining an external contour and an internal surface defining a cavity. The fixed structure also has one or more edges defining a cutout. The contoured surface is coupled to one or more of the edges of the cutout and extends into the cavity. The contoured surface promotes airflow from the cavity to the external contour. The result is a solution to aerodynamic losses that does not require an auxiliary track system or moving parts.

19 Claims, 4 Drawing Sheets

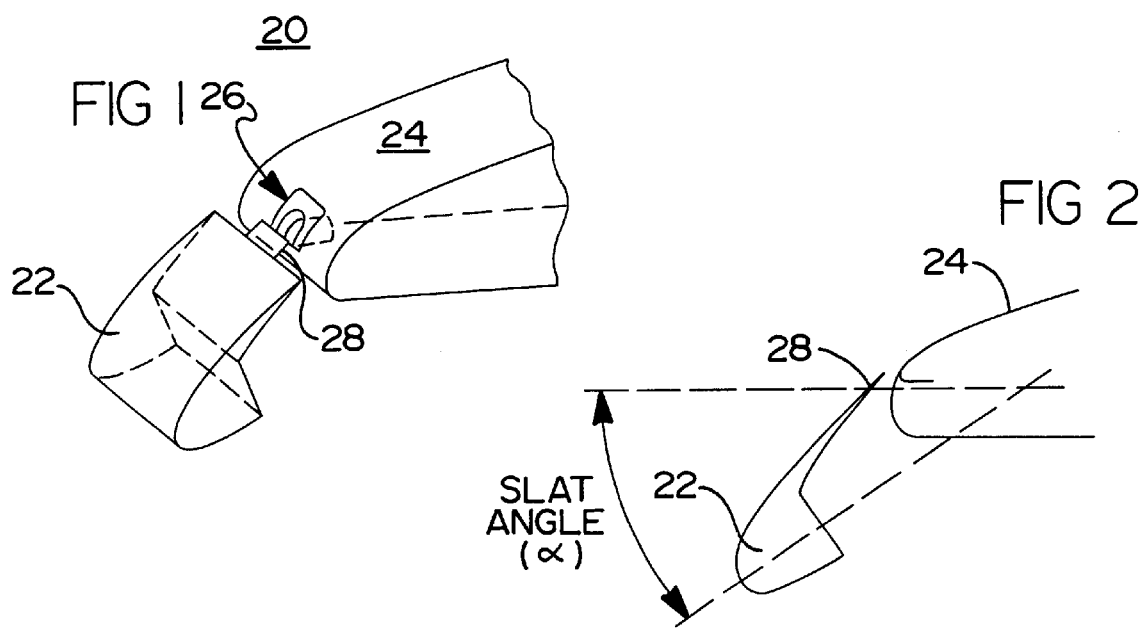
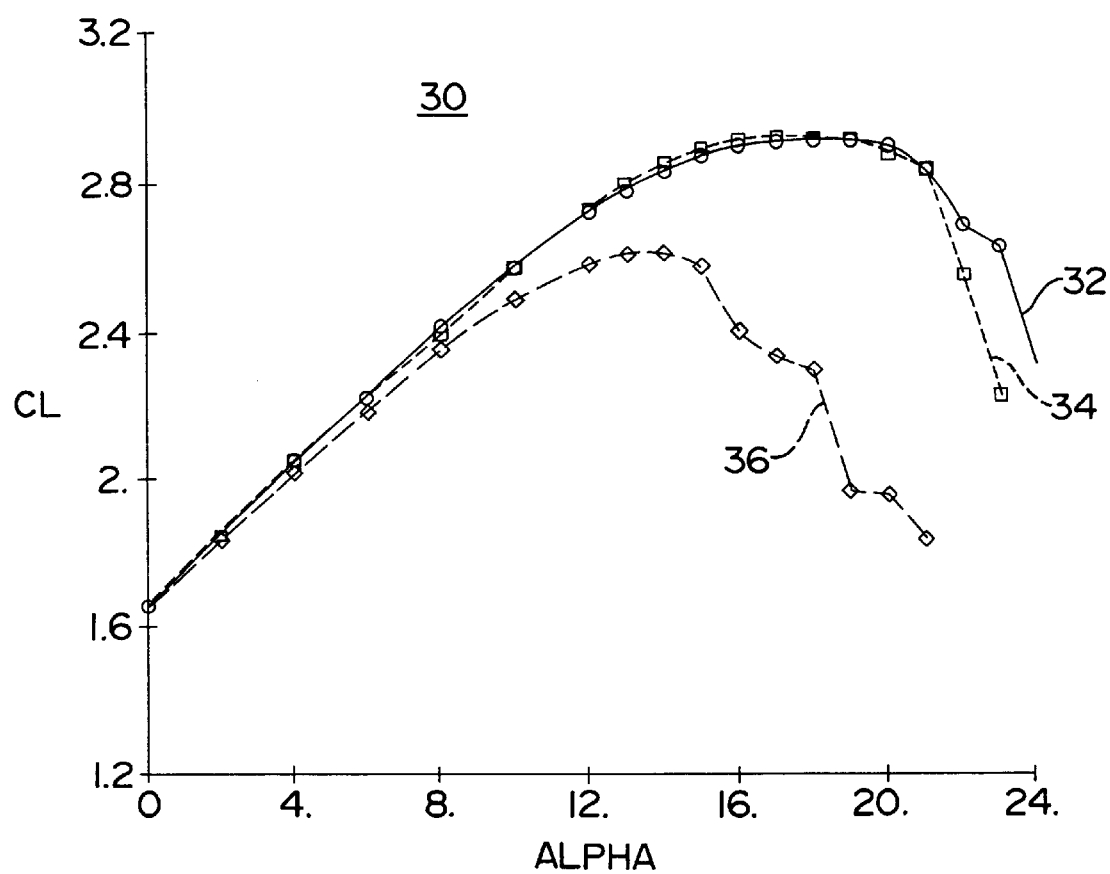
FIG 3

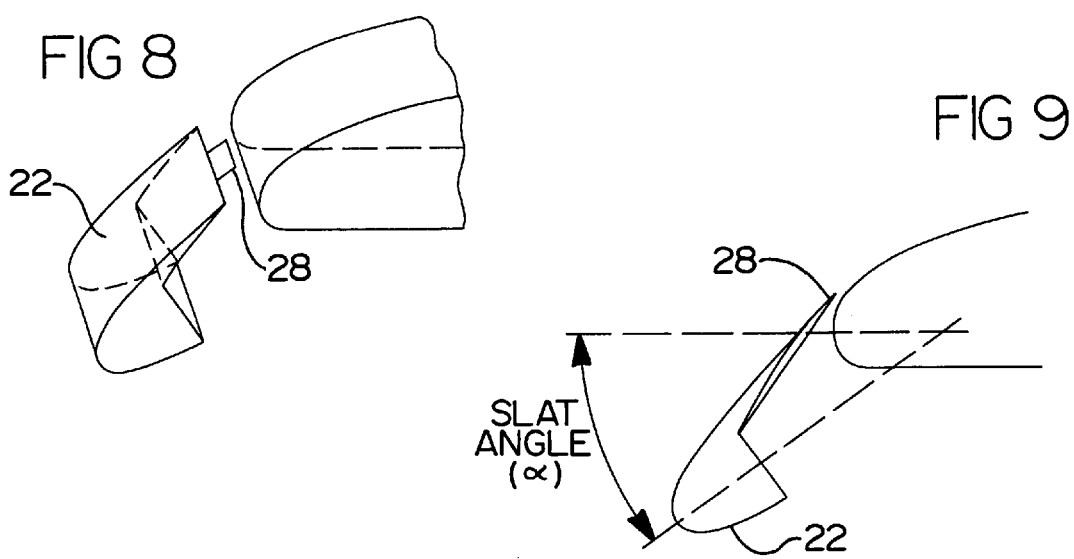
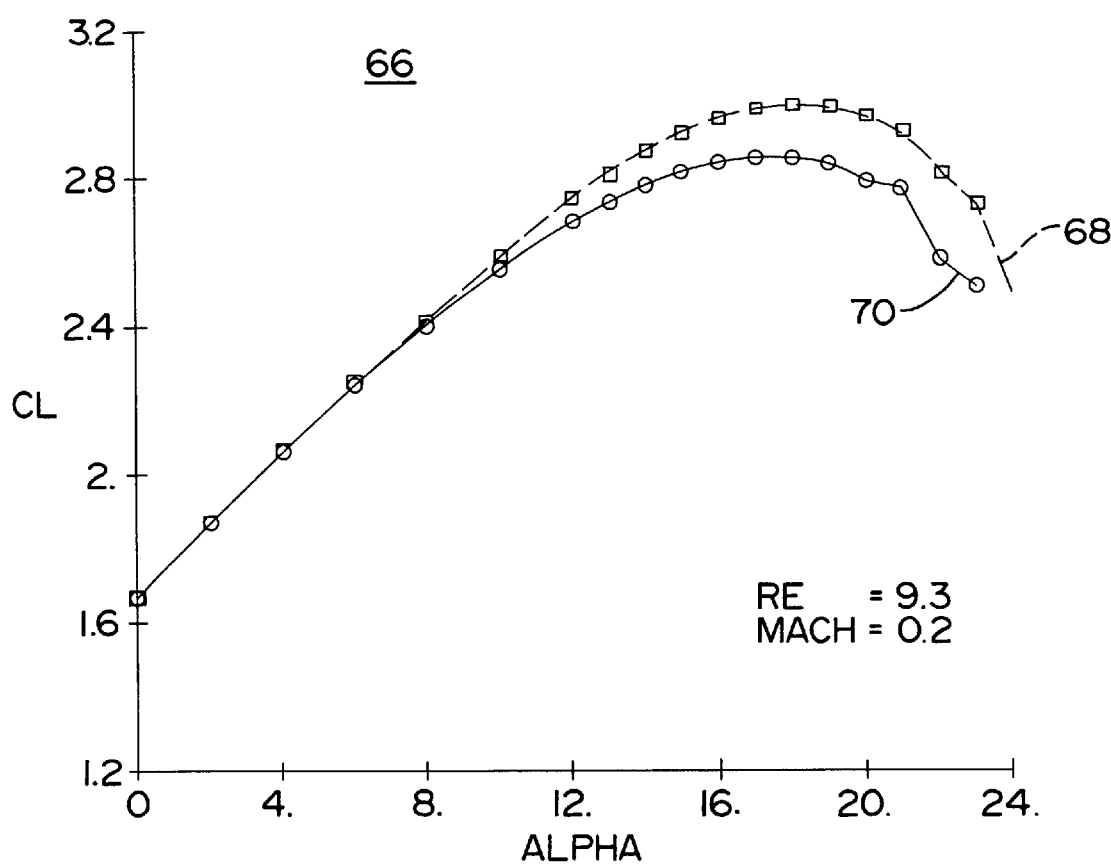

TAILORED WING ASSEMBLY FOR AN AIRCRAFT MOVEABLE SLAT SYSTEM

BACKGROUND OF THE INVENTION

1. Field of the Invention

The present invention generally relates to aircraft wing assemblies. More particularly, the invention relates to a wing assembly for an aircraft moveable slat system having a contoured surface to improve airflow.

2. Technical Background

It is well documented that improving aerodynamics is a central goal of the aircraft manufacturing industry. Due to cost and safety concerns, certain wing assemblies have particularly been the focus of attention moreso than others. For example, the leading edge of a typical aircraft wing will have an inboard slat as well as a number of outboard slats. Leading edge slats are critical to the improvement of the takeoff and landing performance of the aircraft. For example, when the slats extend, they increase the aerodynamic lift of the wing. The leading edge slats also function to increase the angle of attack at which the wing stalls. Thus, a typical moveable slat system for an aircraft wing will include a slat having an outer geometry which defines a leading edge of the aircraft wing, and an actuation mechanism. The actuation mechanism is coupled to the slat for positioning the slat with respect to the aircraft. The moveable slat system will also have a wing assembly (or Surface-1) positioned immediately adjacent to the slat such the actuation mechanism extends through a cutout of the wing assembly. As will be discussed below, this cutout can be particularly troublesome with regard to aerodynamic lift.

The region between the slat trailing edge and the edge structure is typically gapped for landing configurations. This provides the largest amount of aerodynamic lift for a given wing area. This gapped region experiences high velocity aerodynamic flows especially during maximum lift conditions. The above-discussed cutout is located in a region of the wing where disruptions in the flow field can affect the maximum lift generated by the entire wing. The amount of exposed cutout above the slat trailing edge at landing has therefore been correlated with increased aerodynamic losses.

One technique to minimize the cutout penalty is referred to as the dual pivot design. The dual pivot design uses a slat position for landing which completely covers the cutout. This approach has been used on various wing designs, and requires an auxiliary track system to obtain the high slat height. The auxiliary track system, however, comes at a significant cost. Cost figures have been on the order of $250,000 per aircraft relative to a single pivot slat system (to be described below). It is therefore desirable to provide a moveable slat system that does not require an auxiliary track system in order to minimize the aerodynamic losses associated with the wing assembly cutout.

The single pivot slat design was developed to provide equivalent aerodynamic performance as the dual pivot design but without the need for an auxiliary track system. The single pivot design has a lower slat trailing edge height at landing relative to a dual pivot slat system. The lower height exposes a larger amount of cutout to the high velocity air stream which exists above the slat trailing edge on the wing top surface. The cutout problem is addressed in this approach with a fully articulating track door system to cover the cutout. There are a number of difficulties, however, associated with the track door system. For example, the doors are expensive due to part count and complexity. Costs on the order of $50,000 per aircraft have been experienced. Furthermore, the doors require a fairly large actuating spring to allow closure. This increases forces to the door, thereby requiring a heavier structure. In addition, the doors slide in tracks with fairly small slots between the door and the track. The slot could be prone to blockage due to heavy icing conditions, especially in the case of glare ice.

Furthermore, it is important to note that moving devices generally require more maintenance than fixed devices. The above-described track door system also has a number of failure modes such as freezing in the up position, or freezing in the down position. When the door system freezes in the down position, retraction can result in breakage. It is also known that both of these failure modes leave the cutout unprotected with a subsequent loss in aerodynamic performance. It is therefore desirable to provide a wing assembly for an aircraft wing moveable slat system that does not have moveable hardware. The elimination of moveable hardware would provide a number of unique benefits. For example, the resulting system would be cheaper and more simply manufactured. Furthermore, eliminating the need for actuation improves reliability and setup time.

SUMMARY OF THE INVENTION

The above and other objectives are provided by a wing assembly for an aircraft moveable slat system in accordance with the present invention. The wing assembly has a fixed structure and a contoured surface. The fixed structure has an exterior surface defining an external contour and an interior surface defining a cavity. The fixed structure also has one or more edges defining a cutout. The contoured surface is coupled to one or more of the edges of the cutout and extends into the cavity. The contoured surface promotes airflow from the cavity to the external contour. The result is a solution to aerodynamic losses that does not require an auxiliary track system or moving parts.

Further in accordance the present invention, a moveable slat system for an aircraft wing has a slat, an actuation mechanism, and a wing assembly. The slat has an outer geometry which defines a leading edge of the aircraft wing. The actuation mechanism is coupled to the slat for positioning the slat with respect to the aircraft. The wing assembly is positioned adjacent to the slat such that the actuation mechanism extends through a tailored cutout of the wing assembly. Providing a tailored cutout in a moveable slat system represents an improvement over conventional systems with respect to costs, aerodynamic lift, and weight.

Further in accordance with the present invention, a method for directing airflow from a wing assembly cavity of an aircraft wing to a top surface of the wing is provided. The method includes the steps of defining the cavity and an external contour with a fixed structure, and defining a cutout with one or more edges of the fixed structure. A contoured surface is then coupled to one or more of the edges of the cutout such that the contoured surface extends into the cavity and promotes airflow from the cavity to the external contour.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one of ordinary skill in the art by reading the following specification and sub-joined claims and by referencing the following drawings, in which:

FIG. 1 is a perspective view of a moveable slat system according to one embodiment of the present invention;

FIG. 2 is a side view of the moveable slat system shown in FIG. 1;

FIG. 3 is a plot demonstrating aerodynamic lift performance for the moveable slat system shown in FIGS. 1 and 2;

FIG. 8 is a perspective view of a moveable slat system with an extension cantilevered off a trailing edge of the slat in accordance with the principles of the present invention;

FIG. 9 is a side view of the moveable slat system shown in FIG. 8; and

FIG. 10 is a plot demonstrating aerodynamic performance of the moveable slat system shown in FIGS. 8 and 9.

DETAILED DESCRIPTION OF THE PREFERRED EMBODIMENTS

Figure 4:
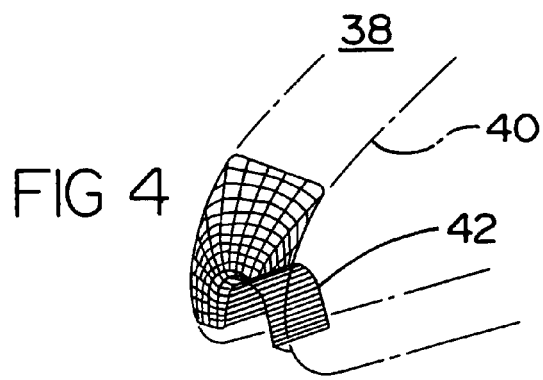
FIG. 4 is a perspective view of a wing assembly in accordance with one embodiment of the present invention.

Reference will now be made in detail to the present preferred embodiments of the invention, examples of which are illustrated in the accompanying drawings. Wherever possible, the same reference numerals will be used throughout the drawings to refer to the same or like parts.

Turning now to FIG. 1, the preferred moveable slat system 20 is shown. Generally, the slat system 20 has a slat 22, an actuation mechanism (not shown), and a wing assembly 24. The slat 22 has an outer geometry which defines a leading edge of an aircraft wing. While the preferred slat 22 will be described as being an inboard slat, the present invention can be readily applied to outboard slats as well. The actuation mechanism is coupled to the slat 22 for positioning the slat 22 with respect to the aircraft. It will be appreciated that the actuation mechanism can be any type of conventional actuation mechanism. Exemplary actuation mechanisms are described in U.S. Pat. No. 4,399,970 to Evans, and U.S. Pat. No. 5,544,847 to Bliesner, incorporated herein by reference.

The wing assembly 24 is positioned immediately adjacent to the slat 22 such that the actuation mechanism extends through a tailored cutout 26 of the wing assembly 24. Tailoring the cutout 26 represents an improvement over all conventional wing assemblies. For example, the tailored cutout 26 provides a low cost fixed hardware device which provides the aerodynamic benefits of a moveable door system at a reduced cost and increased safety. Furthermore, aerodynamic testing validates the concept of tailoring and demonstrates the performance differences between the various cutout geometries. In a highly preferred embodiment, the slat 22 has an extension 28 cantilevered off of a trailing edge of the slat 22.

Figure 5:
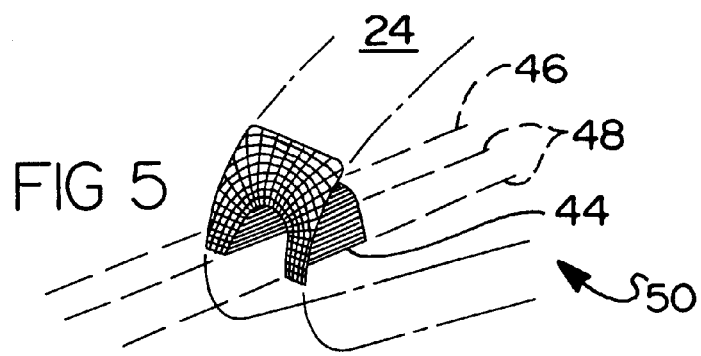
FIG. 5 is a perspective view of a wing assembly in accordance with an alternative embodiment of the present invention.
Figure 6:
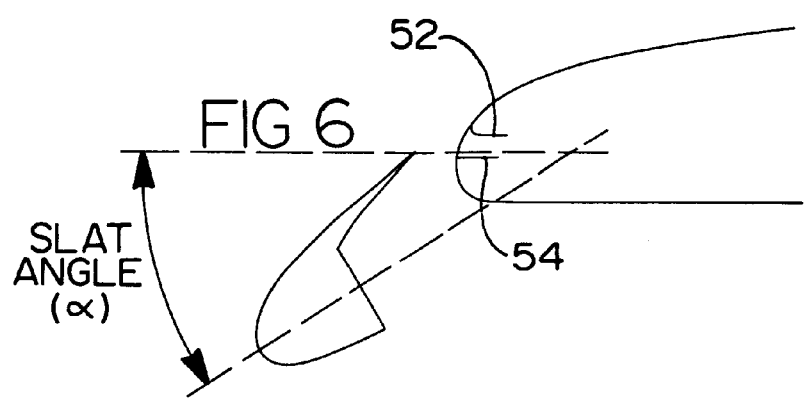
FIG. 6 is a side view of a wing assembly demonstrating the tailoring profiles shown in FIGS. 4 and 5.

FIG. 3 demonstrates the aerodynamic performance of the preferred embodiment at plot 30. It can be seen that a completely sealed cavity demonstrated by curve 32 results in a maximum coefficient of lift of approximately 2.9. Removing the cutout, however, is not an acceptable solution in many cases due to the need to actuate the slat. A high tailored cavity demonstrated by curve 34 results in a nearly identical coefficient of lift for slat angles below 20 degrees. The slat angle $\alpha$ is measured from horizontal. By contrast, a traditional open cavity demonstrated by curve 36 has a maximum coefficient of lift of about 2.6. As will be discussed below, the cutout can have a profile that is tailored to provide the desired level of aerodynamic performance. Furthermore, the cutout profile demonstrated by curve 34 can provide optimal results when used in conjunction with the slat extension. Turning now to FIGS. 4–6, the wing assembly of the present invention will be described in greater detail. Specifically, FIG. 4 illustrates a wing assembly 38 having a relatively low tailoring profile. Specifically, the wing assembly 38 has a fixed structure 40 and a contoured surface 42. The fixed structure 40 has an exterior surface defining an external contour and an interior surface defining a cavity. The fixed structure 40 also has one or more edges defining a cutout. The contoured surface 42 is coupled to one or more of the edges of the cutout and extends into the cavity. Using the contoured surface 42 to promote airflow from the cavity to the external contour provides unique benefits that are unachievable through conventional approaches. It will further be appreciated that the contoured surface 42 can be coupled to the fixed structure 40 by welding or any other conventional attachment technique.

FIG. 5 illustrates the high tailoring profile shown in FIG. 1. Specifically, the higher profile results in less resistance to airflow from the cavity to the external contour and therefore corresponds to less aerodynamic lift than achievable through a lower profile. The desired profile is achieved by providing a variable radius shape for the contoured surface 44. The variable radius shape has an upper centerline location 46 and side edge locations 48. The variable radius shape decreases in radius from the upper centerline location 46 to the side edge locations 48. Thus, by varying the upper centerline location and/or the rate of decrease in the variable radius, the contoured surface 44 can be tailored to meet the specific aerodynamic requirements of the given application.

The concept behind the variable radius was developed based on interpretations of the direction of the airflow streamlines emerging from the cutout. The air movement is from the high pressure underside of the wing to the low pressure upperside. The cutout therefore provides a slot for the air to flow between the two pressure differentials. As the air leaves the cavity 50, on the wing upper surface it is rapidly entrained into the main wing airstream. The main wing airstream is moving almost perpendicularly to the leading edge at the cutout location. The entrainment of the cavity airstream therefore causes the air moving out of the center of the cavity 50 to flow around the tailored shape in an almost perpendicular path.

A radius of approximately 0.75 percent wing chord was chosen for the centerline lift based on past experiences with similar high lift flow-fields. The radius around the side edges of the contour are varied from the centerline value to zero at the side edge locations 48. The rate of radius reduction is preferably based on the flow-field which moves in a helical pattern around the contoured edge for locations away from the centerline. The helical radius, over which the air moves, is preferably designed to produce approximately the same effective radius as the centerline perpendicular path.

Figure 7:
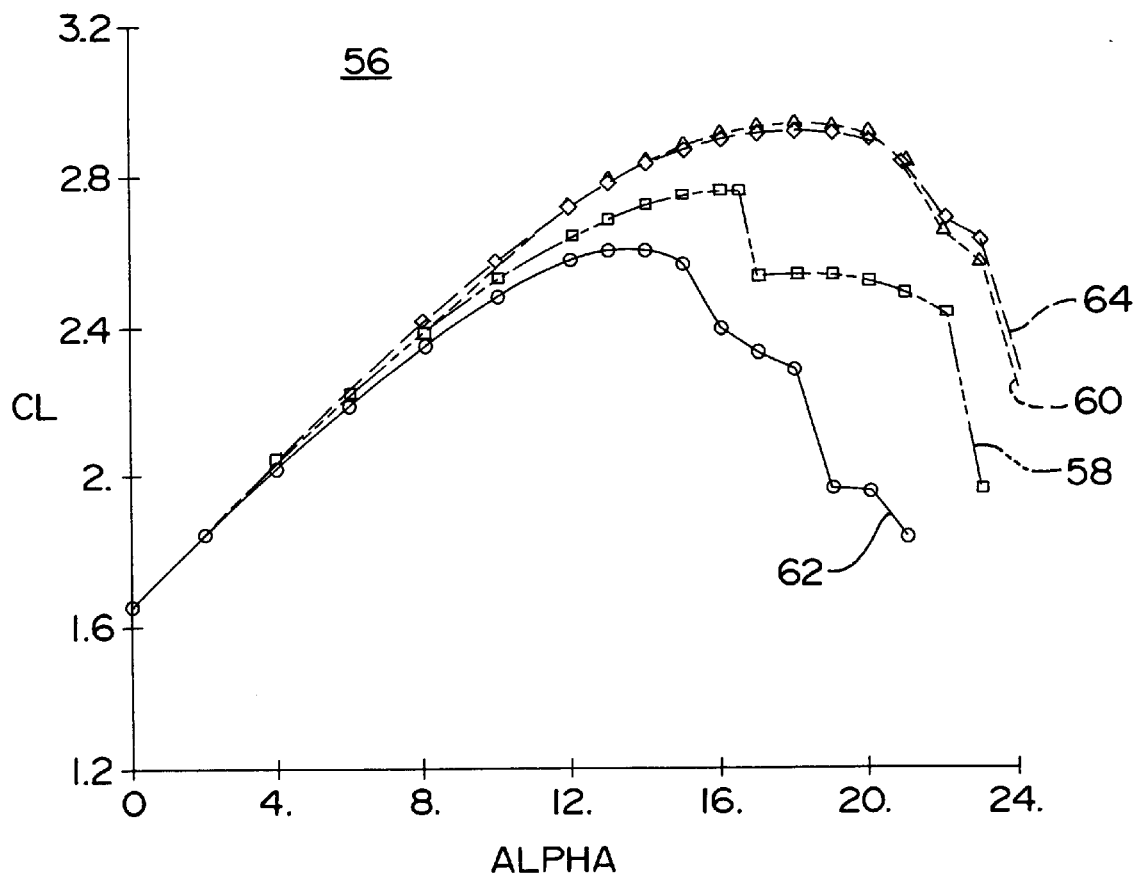
FIG. 7 is a plot demonstrating aerodynamic performance of the wing assemblies shown in FIGS. 4–6.

Turning now to FIGS. 6 and 7, a baseline comparison between a high profile design 52 and a low profile design 54 can be seen. Specifically, plot 56 contains a number of curves including a high tailoring curve 58 corresponding to the high profile design 52 and a low tailored curve 60 corresponding to the low profile design 54. The plot 56 also has a high open cavity curve 62 which represents a worst case scenario of having an unprotected cutout for the high cavity conditions. A low open cavity curve 64 represents the worst case scenario of having an unprotected cutout for the low cavity conditions. The data shown in plot 56 illustrates a sizeable reduction in maximum coefficient lift between the field cutout case and the two open cavity cases. The aerodynamic penalty is considerably larger for the cavity with the largest cutout height. The low tailored cavity gives slightly higher maximum coefficient of lift levels relative to the fully sealed case. This completely restores the aerodynamic penalty for the low open cavity case.

It can be seen that the high tailored cavity reduces the penalty by 60 percent relative to the high open cavity case. The high open cavity represents a maximum cutout size or a single pivot slat configuration. The large cavity size results from replacement of the slat rigging adjustment mechanism.

The contoured surface preferably includes a flexible material to allow the shape to restore itself in the event the cutout fills with ice. Any material such as rubber would be suitable for this purpose.

Turning now to FIGS. 8–10, it can be seen that the slat 22 can also be tailored to improve aerodynamic performance. Specifically, an extension 28 is attached to the trailing edge of the slat 22 to improve lift. The extension 28 is known in the art as being a technique for reducing penalties from cutouts. The extension curve 68 of plot 66 shows a maximum coefficient of lift improvement above the baseline curve 70. The baseline curve 70 represents the fully sealed cutout case. The physical mechanism behind this improvement was based on providing a pair of counter rotating vortices which start from the back edges of the slat extension and propagate over the wing surface. The vortices entrain high speed airflow into the wake region which propagates behind each slat bracket. This bracket improvement mechanism was included due to its additional benefit relative to the tailored wing assembly.

A key advantage associated with the present invention is the complete aerodynamic restoration of the open cavity using non-moving parts. This results in an 80 to 90 percent savings in the costs of moveable doors, which would not be required. Another benefit includes the improvement in system safety due to failure modes of the moveable door relative to a fixed system which remains in a protective position at all times. Furthermore, since moveable doors are not required, reliability and setup time is significantly improved. Estimated cost savings per airplane are approximately $40,000 and the present invention would result in a weight savings of approximately 20 to 40 pounds, depending on the size of the aircraft. These weight savings are based on eliminating approximately 80 per cent of the track and door system hardware.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A wing assembly for an aircraft movable slat system, the wing assembly comprising:

a fixed structure having an exterior surface defining an external contour and an interior surface defining a cavity, the fixed structure having one or more edges defining a cutout, a contoured surface coupled to one or more of the edges of the cutout and extending into the cavity, an actuation mechanism coupled to said slat system, wherein the cavity permits stowage of the actuation mechanism, said contoured surface promoting airflow from the cavity to the external contour.

2. The wing assembly of claim 1 wherein the contoured surface has a variable radius shape.

3. The wing assembly of claim 2 wherein the variable radius shape has an upper centerline location and side edge locations, the variable radius shape decreasing in radius from the upper centerline location to the side edge locations.

4. The wing assembly of claim 3 wherein the upper centerline location has a radius of approximately 0.75% wing chord.

5. The wing assembly of claim 3 wherein the side edge locations have a radius of approximately zero.

6. The wing assembly of claim 5 wherein the variable radius shape has a helical rate of radius reduction.

7. The wing assembly of claim 1 wherein the contoured surface includes a flexible material.

8. The wing assembly of claim 7 wherein the flexible material includes rubber.

9. A movable slat system for an aircraft wing, the slat system comprising:

a slat having an outer geometry which defines a leading edge of the aircraft wing, an actuation mechanism coupled to the slat for positioning the slat with respect to the aircraft, a wing assembly positioned adjacent to the slat such that the actuation mechanism extends through a tailored cutout of the wing assembly, a contoured surface coupled to one or more of the edges of the cutout and extending into the cavity, and said contoured surface promoting airflow from the cavity to the external contour, wherein said cavity permits stowage of the actuation mechanism.

10. The slat system of claim 9 wherein the contoured surface has a variable radius shape.

11. The slat system of claim 10 wherein the variable radius shape has an upper centerline location and side edge locations, the variable radius shape decreasing in radius from the upper centerline location to the side edge locations.

12. The slat system of claim 9 wherein the contoured surface includes a flexible material.

13. The slat system of claim 12 wherein the flexible material includes rubber.

14. The slat system of claim 9 wherein the slat includes an extension cantilevered off of a trailing edge of the slat.

15. A method for directing airflow from a wing assembly cavity of an aircraft wing to a top surface of the wing, the method comprising the steps of:

defining the cavity and an external contour with a fixed structure surface, defining a cutout in the fixed structure with one or more edges;

coupling a contoured surface to one or more of the edges of the cutout such that the contoured surface extends from the cutout into the cavity, stowing an actuation mechanism in the cavity, coupling an actuation mechanism to a slat having an outer geometry, which defines a leading edge of the aircraft wing extending the actuation mechanism through the cutout, promoting airflow from the cavity to the external contour.

16. The method of claim 15 further including the step of defining a variable radius shape for the contoured surface.

17. The method of claim 15 further including the step of cantilevering an extension off of a trailing edge of the slat.

18. A wing assembly for an aircraft movable slat system, the wing assembly comprising:

a fixed structure having an exterior surface defining an external contour and an interior surface defining a cavity, the fixed structure having one or more edges defining a cutout;

a contoured surface coupled to one or more of the edges of the cutout and extending into the cavity;

said contoured surface promoting airflow from the cavity to the external contour;

said contoured surface having a variable radius shape with an upper centerline location and side edge locations; and said variable radius shape decreasing in radius from said upper centerline location to said side edge locations, wherein said upper centerline location has a radius of approximately 0.75% wing chord.

19. A wing assembly for an aircraft movable slat system, the wing assembly comprising:

a fixed structure having an exterior surface defining an external contour and an interior surface defining a cavity, the fixed structure having one or more edges defining a cutout;

a contoured surface coupled to one or more of the edges of the cutout and extending into the cavity;

said contoured surface promoting airflow from the cavity to the external contour;

said contoured surface having a variable radius shape, wherein the variable radius shape has an upper centerline location and side edge locations;

said variable radius shape decreasing in radius from said upper centerline location to said side edge locations, wherein said side edge locations have a radius of approximately zero; and said variable radius shape has a helical rate of radius reduction.

* * * * *